United States Patent
Goodwin et al.

(10) Patent No.: US 9,265,066 B2
(45) Date of Patent: Feb. 16, 2016

(54) METHODS AND DEVICES FOR SCHEDULING UPLINK TRANSMISSION IN A CELLULAR RADIO SYSTEM

(75) Inventors: Graham C Goodwin, Newcastle (AU); Katrina Lau, Newcastle (AU)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 229 days.

(21) Appl. No.: 14/127,080

(22) PCT Filed: Jun. 20, 2011

(86) PCT No.: PCT/SE2011/050784
§ 371 (c)(1),
(2), (4) Date: Dec. 17, 2013

(87) PCT Pub. No.: WO2012/177189
PCT Pub. Date: Dec. 27, 2012

(65) Prior Publication Data
US 2014/0133421 A1    May 15, 2014

(51) Int. Cl.
*H04W 72/14* (2009.01)
*H04W 72/12* (2009.01)

(52) U.S. Cl.
CPC .......... *H04W 72/14* (2013.01); *H04W 72/1252* (2013.01); *H04W 72/1268* (2013.01)

(58) Field of Classification Search
None
See application file for complete search history.

(56) References Cited

U.S. PATENT DOCUMENTS

2005/0268063 A1* 12/2005 Diao ...................... G06F 9/5083 711/170
2007/0054619 A1* 3/2007 Kinnunen ............... H04W 28/26 455/63.1
2007/0248035 A1* 10/2007 Sang ................... H04W 52/346 370/318
2009/0131068 A1* 5/2009 Wu .................... H04W 72/1231 455/452.2

FOREIGN PATENT DOCUMENTS

| EP | 2063678 A1 | 5/2009 |
| WO | 2009041882 A2 | 4/2009 |
| WO | 2011071430 A1 | 6/2011 |

OTHER PUBLICATIONS

Kumaran et al. "Uplink Scheduling in CDMA Packet-Data Systems." IEEE. 2003.
Lau et al. "Performance Analysis of SIMO Space—Time Scheduling With Convex Utility Function: Zero-Forcing Linear Processing." IEEE Transactions on Vehicular Technology. vol. 53, No. 2. Mar. 2004.

(Continued)

*Primary Examiner* — Christopher Crutchfield
*Assistant Examiner* — Tito Pham
(74) *Attorney, Agent, or Firm* — Patents on Demand, P.A.; Brian K. Buccheit; Scott M. Garrett

(57) ABSTRACT

In methods and devices for scheduling uplink transmission in a cellular radio system for a number of user equipments transmitting data over an air-interface each user equipment is associated with an individual uplink load factor. Further a cost function is formed based on the load factor for each user equipment that is to be scheduled for uplink transmission, wherein the cost function is approximated by a quadratic function. The throughput of all scheduled user equipments is maximized using a convex optimization of the sum of the individual cost functions, and the grant for uplink transmission is scheduled in accordance with the optimized cost functions.

12 Claims, 16 Drawing Sheets

(56) References Cited

OTHER PUBLICATIONS

Oh et al. "Adaptive Resource Allocation in Power Constrained CDMA Mobile Networks." IEEE. 1999.

Oh et al. "Optimal Resource Allocation in Multiservice CDMA Networks." IEEE Transactions on Wireless Communications. vol. 2, No. 4. Jul. 2003.

Oh et al. "Optimality of greedy power control and variable spreading gain in multi-class CDMA mobile networks." Mobicom 1999, Seattle, Washington. ACM. 1999.

Shu et al. "A Channel-Adaptive and Throughput-Efficient Scheduling Scheme in Voice/Data DS-CDMA Networks with Constrained Transmission Power." IEEE. 2003.

Zhang et al. "HSUPA Scheduling Algorithms Utilizing RoT Measurements and Interference Cancellations." IEEE ICC. 2008.

Zhang et al. "Optimal Resource Allocation for Data Service in CDMA Reverse Link." IEEE Transactions on Wireless Communications. vol. 6, No. 10. Oct. 2007.

* cited by examiner

METHODS AND DEVICES FOR SCHEDULING UPLINK TRANSMISSION IN A CELLULAR RADIO SYSTEM

TECHNICAL FIELD

The present invention relates to methods and devices for scheduling uplink transmission in a cellular radio system.

BACKGROUND

The scheduler for the enhanced uplink (EUL) schedules EUL traffic of multiple users. EUL serves as a counterpart to the high speed downlink packed access (HSDPA) service in the Wideband Code Division Multiple Access (WCDMA) downlink. Together, EUL and HSDPA provide the backbone for the mobile broadband for a WCDMA cellular system. The scheduler operates in a closed loop fashion, where transmission grants, i.e. control signals, are issued in response to transmission requests and air interface load (measurements). The third generation partnership project (3GPP) standard provides channels with certain associated capacity, range and delay properties. Notably, the control loop is dynamic, with nonlinear constraints and plenty of discrete ranges of various states.

In this context the load on the uplink is of central importance. The task of the scheduler is to schedule as much traffic as possible, at the same time as the uplink coverage and stability needs to be maintained. In case a too large amount of traffic is scheduled, the interference from other terminals can make it impossible for terminals at the cell edge to maintain communication—the coverage of the cell becomes too low. The cell may also become unstable in case too much traffic is scheduled. In order to avoid these two problems the scheduler schedules traffic under the constraint that the air interface load is held below a specific value. The load factor of a cell is defined as the fraction of the own cell uplink power, and the total uplink interference. The total uplink interference consists of the sum of the own cell power, the neighbor cell interference and the thermal noise floor. The load factor of a user is equivalently given by the quotient of the user power and the total wideband received power ($P\_u/P\_RTWP$).

Enhanced Uplink in WCDMA

The WCDMA enhanced uplink aims at scheduling traffic to times when the uplink interference situation is favorable, thereby utilizing air interface resources in a better way than before. The air interface load is measured by the noise rise, over the thermal level, a quantity denoted rise over thermal (RoT). This is illustrated in FIG. 1, which illustrates the air interface load. The pole capacity is the limiting theoretical bit rate of the uplink, corresponding to an infinite noise rise.

The uplink data channel is denoted E-DPDCH. This channel supports a high rate. It is however not involved in the scheduling control as such, this is the task of the corresponding control channel, denoted E-DPCCH. This channel e.g. carries rate requests (measurement signals) from the User equipments (UEs) to the EUL scheduler. There are also some downlink channels supporting EUL. The first of these is the E-AGCH channel which carries absolute grants (control signals) to each UE. More peripheral is the E-RGCH channel which carries relative grants (also control signals) from the radio base station node B to the UE. Finally, the E-HICH channel carries ACK/NACK information.

The grants mentioned above are the quantities signaled to the UE indicating what rate (actually power) it may use for its transmission. The UE can, but need not, use its complete grant. Relative grants are used to control the interference in neighbor cells—these can only decrease the current grant of the UE one step. It is stressed that there are only a discrete number of grant levels that can be used.

Scheduling in Enhanced Uplink

The task of the scheduler is to schedule EUL user traffic, to enhance user and cell capacity, at the same time as it:

Keeps track of the air interface cell load, avoiding overscheduling that may cause cell instability and loss of coverage.

Keeps track of other available traffic, like transport resources and hardware.

Receives, measures and estimates quantities relevant for its scheduling operation.

Transmits orders to UEs, primarily in the form of granted power/bitrates.

When doing this the scheduler needs to operate within the constraints induced by the 3GPP standard, these constraints being e.g.

Limited grant transmission capacity.

Grant transmission delays.

Grant step up rate limitations.

Standard limited UE status information.

Conventional schedulers are designed with different objectives in mind. UEs are e.g. given the maximum rate as long as there are resources available, in an order defined by a priority list. Then, in case of lack of resources, overload handling is invoked. This overload handling reduces the priority of the UE with the best grant to a very low priority, thereby resulting in switching in case of conflicting high rate users. Since there is a dead time until re-scheduling takes effect, this results in a loss of capacity.

UEs in EUL Scheduling

The UEs form an integral part of the scheduling loop. In this case it is not the data transfer on the E-DPDCH channel that is of interest; rather it is the operation of the UE according to the 3GPP standard that is the focal point. The UE performs e.g. the following tasks:

Reception of absolute grants on the E-AGCH channel (control signal). There are 4 of these channels, however only one absolute grant can be transmitted per Transmission time Interval (TTI) on each channel.

Reception of relative grants on the E-RGCH channel (control signal). The relative grants can only reduce the scheduled grant of the UE by 1 step.

Formation of the scheduled grant of the UE, from the absolute and relative grants. The scheduled grant is the actual grant used by the UE for transmission.

Using the absolute grants and the relative grants, for computation of the power to be used for data transmission. This is expressed using beta factors that are computed as nonlinear functions of the scheduled grant, accounting also for the absolute output power level of the UE.

Transmission of user data, in accordance with the computed beta factor.

Determination and signaling of the happy bit (measurement signal) to the scheduler of the Radio Base Station (RBS). If not happy the UE requests a higher bit rate.

Determination and signaling of scheduled information (measurement signal) to the scheduler of the RBS. The scheduled information is based on the amount of data in the Radio Link Control (RLC) buffer, which allows the scheduler to make scheduling decisions for the UE.

Determination and signaling of the transport format used (E-TFCI). This carries e.g. the actual beta factor applied by the UE, thereby supporting the load estimator that provides the scheduler with information of the current air-interface load.

UEs are divided into different categories depending on whether they support 10 ms TTIs (TTI is roughly the scheduling sampling period) only, or also 2 ms TTIs. Their maximal bit rates also affect the category of the UEs. The details appear in Table 1,

TABLE 1

UE categories in EUL.

| E-DCH category | Minimum SF | Support for 2 ms TTI | Peak Data Rate, 10 ms TTI | Peak Data Rate, 2 ms TTI |
| --- | --- | --- | --- | --- |
| Category 1 | 1 × SF4 | — | 0.73 Mbit/s | — |
| Category 2 | 2 × SF4 | γ | 1.46 Mbit/s | 1.46 Mbit/s |
| Category 3 | 2 × SF4 | — | 1.46 Mbit/s | — |
| Category 4 | 2 × SF2 | γ | 2 Mbit/s | 2.9 Mbit/s |
| Category 5 | 2 × SF2 | — | 2 Mbit/s | — |
| Category 6 | 2 × SF4 + 2 × SF2 | γ | 2 Mbit/s | 5.76 Mbit/s |

Existing Formulation of the Scheduling Problem

In existing cellular systems, scheduling schemes are often designed in an ad hoc manner. This leads to suboptimal performance in terms of throughput and may manifest itself in problems with stability. A reason for the ad hoc design has been the difficulty in computing a solution in real time. A key to overcome this difficulty is to convert the problem to a problem involving maximization of a convex function over a convex polytope. A maximization of a convex function over a convex polytope will also be referred to as a convex maximization/optimization herein.

Further, several papers in the literature consider the problem of scheduling the transmission powers instead of grants, see e.g. Kumaran, K. and Qian, L. (2003), Uplink scheduling in CDMA packet-data systems, in 'Proc. Twenty-Second Annual Joint Conference of the IEEE Computer and Communications (INFOCOM 2003)', Vol. 1, pp. 292-300, Lau, V. and Kwok, Y.-K. (2004), 'Performance analysis of SIMO space-time scheduling with convex utility function: zero-forcing linear processing', IEEE Transactions on Vehicular Technology, 53(2), 339-350, Oh, S.-J. and Wasserman, K. (1999a), Adaptive resource allocation in power constrained CDMA mobile networks, in 'Proc. 1999 IEEE Wireless Communications and Networking Conference', Vol. 1, pp. 510-514, Oh, S.-J. and Wasserman, K. M. (1999b), Optimality of greedy power control and variable spreading gain in multi-class CDMA mobile networks, in 'MobiCom '99: Proceedings of the 5th annual ACM/IEEE international conference on Mobile computing and networking', ACM, New York, N.Y., USA, pp. 102-112, Oh, S.-J., Zhang, D. and Wasserman, K. (2003), 'Optimal resource allocation in multiservice CDMA networks', IEEE Transactions on Wireless Communications, 2(4), 811-821, Shu, T. and Niu, Z. (2003), A channel-adaptive and throughput-efficient scheduling scheme in voice/data DS-CDMA networks with constrained transmission power, in 'Proc. 2003 IEEE International Conference on Communications (ICC '03)', Vol. 3, pp. 2229-2233, Zhang, D., Oh, S.-J. and Bhushan, N. (2007), 'Optimal resource allocation for data service in CDMA reverse link', IEEE Transactions on Wireless Communications, 6(10), 3648-3656, Zhang, D., Sambhwani, S. and Mohanty, B. (2008), HSUPA scheduling algorithms utilizing RoT measurements and interference cancellations, in 'Proc. 2008 IEEE International Conference on Communications (ICC '08)', pp. 5033-5037.

A typical basic formulation involves maximizing the throughput subject to power saturation limits at the UEs. This requires that the channel gains from the UEs to the Node B be known by the scheduler. The algorithms in these papers typically involve greedy-type strategies. In some cases, the problem of optimizing with respect to the scheduled interference is dealt with by generating a number of candidate (greedy) solutions (each with a different total interference), and then selecting the best one.

In Kumaran and Qian (2003), the problem of scheduling the transmission powers of the users to maximize total throughput is considered. The problem formulation includes constraints on the transmission power of each user as well as a constraint to ensure feasibility. It is assumed that the channel gains are known, and hence that the constraints on the transmission powers can be converted to constraints on the received powers. The throughput is expressed as a weighted sum of user rates, where the weights are chosen to ensure queue stability (boundedness of queue lengths).

The resulting solution has the property that each user transmits at full power or not at all. For a certain given level of interference, the scheduling algorithm in Kumaran and Qian (2003) involves ordering the users according to a particular ranking metric and then allocating full power to the user with the highest ranking. The remaining users are then re-ordered to take into account the previous allocation. The process of re-ordering and allocating to the highest ranking user is repeated until the scheduled interference equals the given level interference. The optimal level of interference is determined by performing the preceding algorithm for a number of allowable interference levels, and then selecting the best one.

In Zhang (2008), a scheduling algorithm which allows a tradeoff between throughput and fairness is described. The algorithm involves sorting the users according to the following priority metric:

$$\text{Priority}(k) = \frac{[r_{req}(k)]^{1/\beta}}{\tilde{r}(k)}$$

where $\tilde{r}(k)$ is the filtered throughput for the user, $r_{req}(k)$ is the rate requested by the user and $\beta$ is a parameter, which determines the relative degree of fairness between the users. Rate allocation is then done by greedy filling the available load starting from the user with the highest priority. This implies that each user transmits at their requested rate or not at all. The algorithm has the property that it maximizes a function which is closely related to the total throughput.

The existing technologies for scheduling are associated with a number of disadvantages and problems, such as non-optimal throughput, risk for instability, and a risk for coverage loss.

Hence there exist a need for new methods and devices providing improved scheduling in cellular radio systems, in particular WCDMA systems.

SUMMARY

It is an object of the present invention to provide an improved methods and devices to address the problems as outlined above.

This object and others are obtained by the methods and devices as set out in the appended claims.

As has been realized by the inventors existing scheduling methods include the facts that:
1. In order to meet the load constraints users are best scheduled in terms of their load. However
a. the controlling quantity is not the load, but rather the grants.

b. The exact mapping between grants and load is complicated. Therefore existing scheduling schemes have not been formulated in terms of load, instead power, interference and grants are common choices. This may lead to underutilization with respect to the load constraint. Furthermore, measured quantities needed for scheduling may not be available unless load is exploited for scheduling.

2. Scheduling algorithms solve constrained optimization problems, that in order to be computable in real time need to be convex. However, prior art schemes formulated in terms of grants, with load constraints, are in general non-convex, leading to very long computation times and problems that cannot be solved in real time.

3. For some scenarios, not only throughput needs to be addressed, but also fairness between users is an important parameter.

4. Also for some scenarios rate limitation needs to be addressed.

In accordance with one embodiment a method of scheduling uplink transmission in a cellular radio system for a number of user equipments transmitting data over an air-interface is provided. In accordance with the method each user equipment is associated with an individual uplink load factor. The method comprises forming a cost function based on the load factor for each user equipment that is to be scheduled for uplink transmission, wherein the cost function is approximated by a quadratic function. Then the throughput of all scheduled user equipments is maximized using a convex optimization of the sum of the individual cost functions, and the grant for uplink transmission is scheduled in accordance with the optimized cost functions. Hereby it is possible to achieve enhanced mobile broadband performance for example in terms of Enhanced EUL throughput, increased EUL stability margins, reduced risk of power rushes for EUL, and increased EUL cell coverage.

In accordance with one embodiment a determined minimum load is allocated to all user equipments to be scheduled.

In accordance with one embodiment the user equipments are ranked in some order from a highest rank to a lowest rank, and the available load remaining when the minimum load has been allocated is allocated to the user equipments in order of the ranking form the highest to the lowest.

In accordance with one embodiment each user equipment allocated more than the minimum load, is allocated the maximum load of the user equipment or if the maximum load is more than the available load the available load.

In accordance with one embodiment the scheduling takes into account existing ramping constraints.

In accordance with one embodiment each user equipment is associated with a weight, and the weight is adaptively updated in response to past computed load allocations and wherein the scheduling is performed to take the updated weights into account.

The invention also extends to node of a cellular radio network comprising a scheduler arranged to perform the above methods. The scheduler comprises a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

Figure 1:
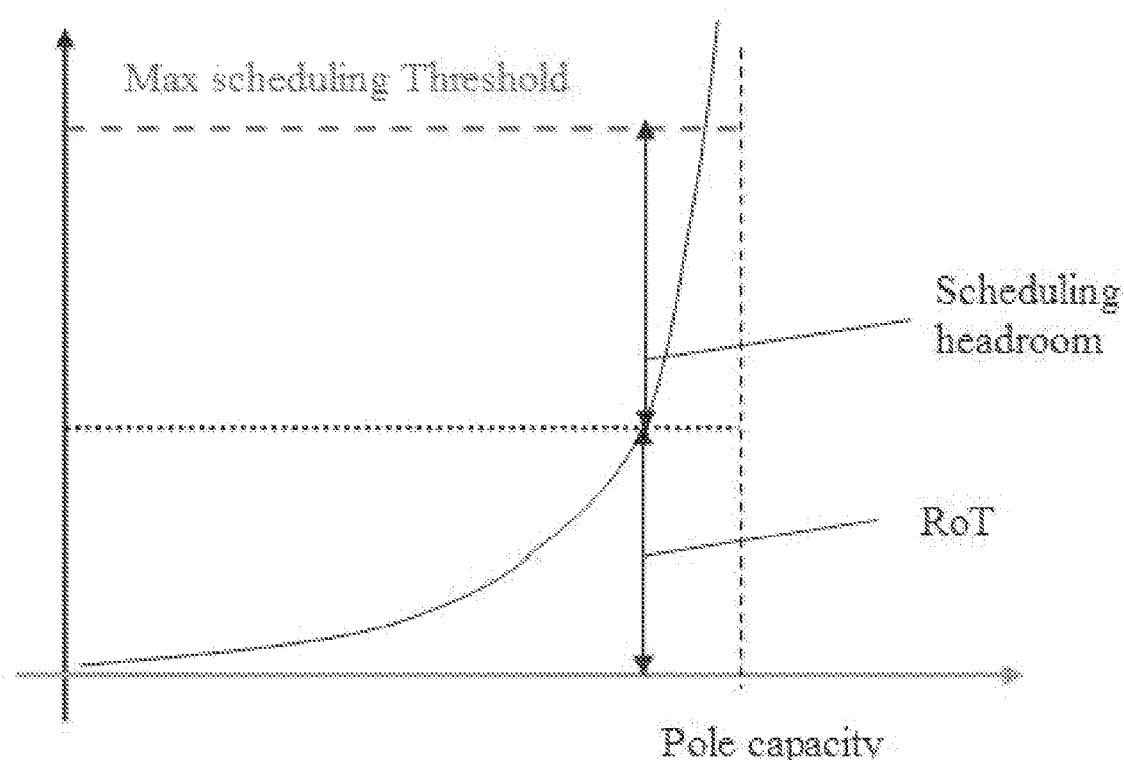
FIG. 1 is a diagram illustrating the air interface load
Figure 2:
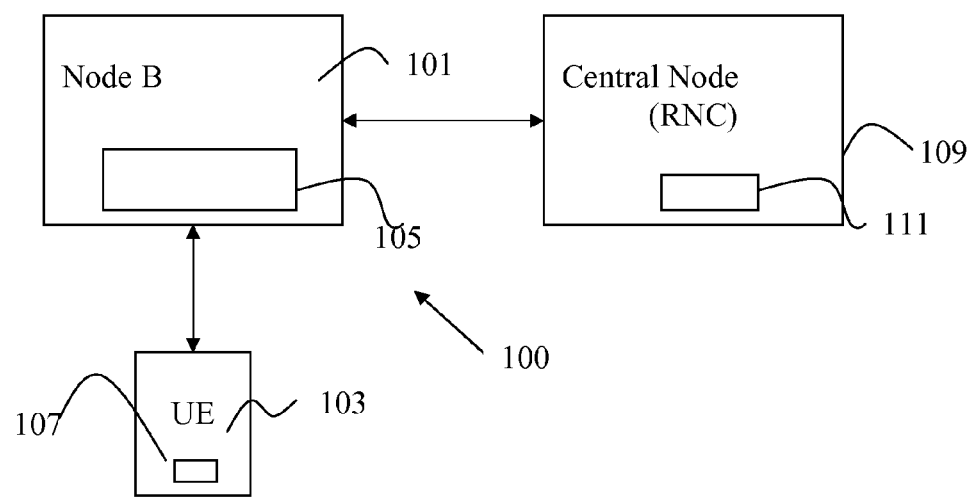
FIG. 2 is a view of a cellular radio system.

In FIG. 2 a general view of a cellular radio system 100 is depicted. The system 100 depicted in FIG. 1 is a UTRAN system. However it is also envisaged that the system can be another similar system. The system 100 comprises a number of base stations 101, also denoted NodeBs, whereof only one is shown for reasons of simplicity. The base station 101 can be connected to by user equipments in the figure represented by the UE 103 located in the area served by the base station 101. Further, the base stations 101 are controlled by a central node such as a Radio Network Controller (RNC) in the case of an UTRAN system. The base station, the central node and the user equipment further comprise controllers/controller circuitry 105, 107 and 111 for providing functionality associated with the respective entities. The controllers/controller circuitry 105 of the radio base station Node B can implement a scheduler used to schedule uplink transmission from the user equipments 103. The controllers 105, 107 and 111 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

As realized by the inventors a way of overcoming the non-convexity of many formulations of the scheduling problem is to let the load factors $L_i$ of the uplink be the scheduled variables. The resulting optimization problem will then have a linear constraint and a nonlinear cost function.

In accordance with some embodiments a convexity preserving cost function, which provides a highly accurately mapping between throughput variables and loads is provided.

To understand this, consider the following basic formulation of the scheduling problem:
Maximize the throughput $$J(\gamma_1, \ldots, \gamma_n) = \sum_{i=1}^{n} \gamma_i \quad (1)$$

Subject to the load constraint $$\sum_{i=1}^{n} L_i \leq L_{max}, \quad (2)$$

and positivity constraints $$\gamma_i \geq 0. \quad (3)$$

Above the $\gamma_i$ really denotes user data individual power scale factors derived from tabulated parameters available in the 3GPP WCDMA standard. The underlying observation is that these scale factors are proportional to the user throughput. The grants are readily computable from the values of gamma $\gamma_i$. It can be shown that the corresponding load factors are given by:

$$L_i = \frac{1 + \gamma_i}{1/S + (1-\alpha)(1+\gamma_i)}, \quad (4)$$

where S is the signal to interference (SIR) value of the user and where a denotes the self-interference factor. The load factor of a user is equivalently given by the quotient of the user power (P_u) and the total wideband received power (P_RTWP), that is (P_u)/(P_RTWP).

The objective function is linear and convex, however the load constraints are highly nonlinear functions of the values of gamma $\gamma_i$, rendering an optimization problem that is nonconvex.

In order to do this, the optimization problem is in accordance with some embodiments expressed in terms of a cost function. That is the following sum is to be maximized:

$$J_L = \sum_{i=1}^{n} f(L_i), \quad$$

where a theoretical calculation using (1) and (4) results in $$f(L_i) = \frac{L_i/S - 1 + L_i(1-\alpha)}{1 - L_i(1-\alpha)} \quad (5)$$

Figure 3:
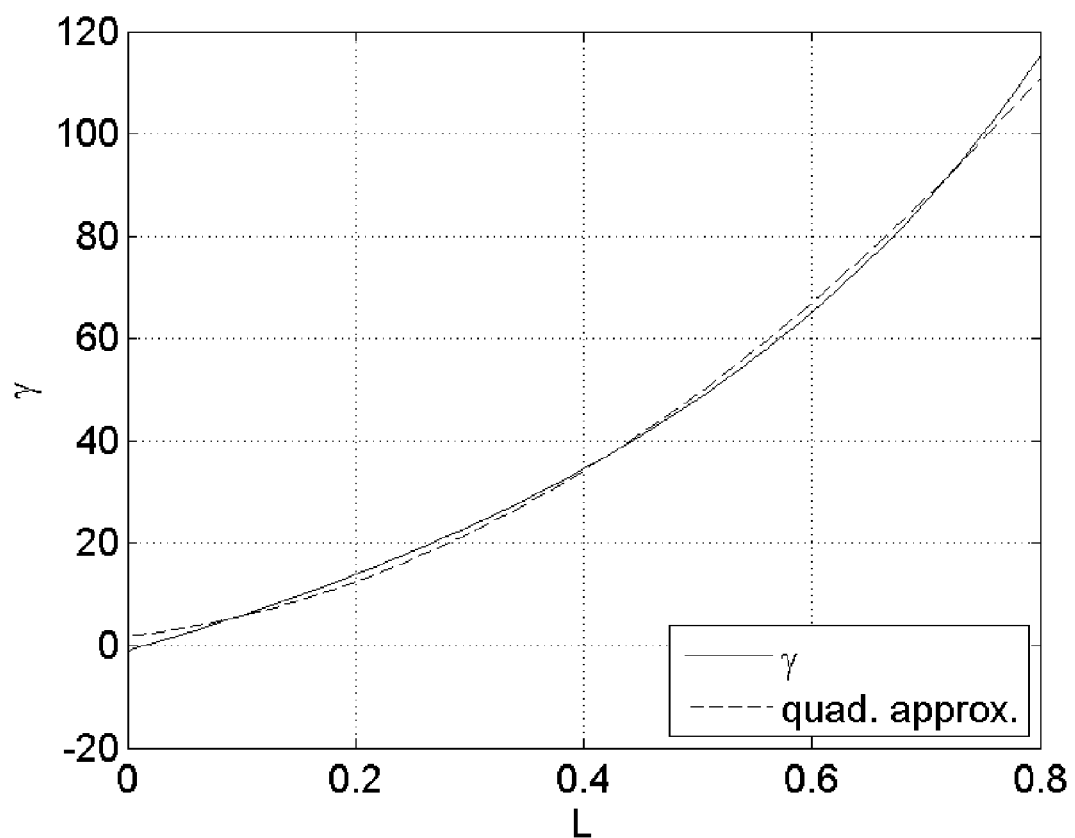
FIG. 3 is a diagram illustrating approximation of a cost function by a quadratic function.

It is then to be observed that the cost function $f(L_i)$ can be very accurately approximated by a quadratic function. The plots in FIG. 3 compares (5) to a quadratic function fit and it can be seen that the agreement is excellent.

Hence, in accordance with some embodiments the cost functions can be expressed as a quadratic function as:

$$f(L_i) = (L_i - c)^2 \quad (6)$$

where c is a constant determined by the quadratic fit. It is stressed that equation (5) is not used.

Based on the above discussions, the basic optimization problem can in some embodiments be expressed as to maximize the throughput $$J(L_1, \ldots, L_n) = \sum_{i=1}^{n} w_i (L_i - c)^2 \quad (7)$$

This maximization can in some embodiments be subject to one or more of the following pre-conditions:

$$L_i \geq L_{i,l} \quad (8)$$

$$L_i \leq L_{i,u} \quad (9)$$

$$\sum_{i=1}^{n} L_i \leq L_{max} \quad (10)$$

This problem formulation is convex. The constant c may typically be −0.09. The $w_i$ put weights on the individual users. The lower bound $L_{i,l}$ corresponds to the minimum load required by the ith user and typically must satisfy $L_{i,l} \geq L_p$ where $L_p = 0.0155$ is the load factor corresponding to $\gamma = 0$, i.e. only control channel. The upper bound $L_{i,u}$ is the UE capability, i.e. corresponding to the maximum $\gamma$ the UE can support. $L_{Max}$ is the load corresponding to the allowed headroom. As for the constraints it is necessary to have the following feasibility constraint in place:

$$\sum_{i=1}^{n} L_{i,l} \leq L_{Max}. \quad (11)$$

such that the sum of the minimum load of all users is less than or equal to the maximum load.

Figure 4:
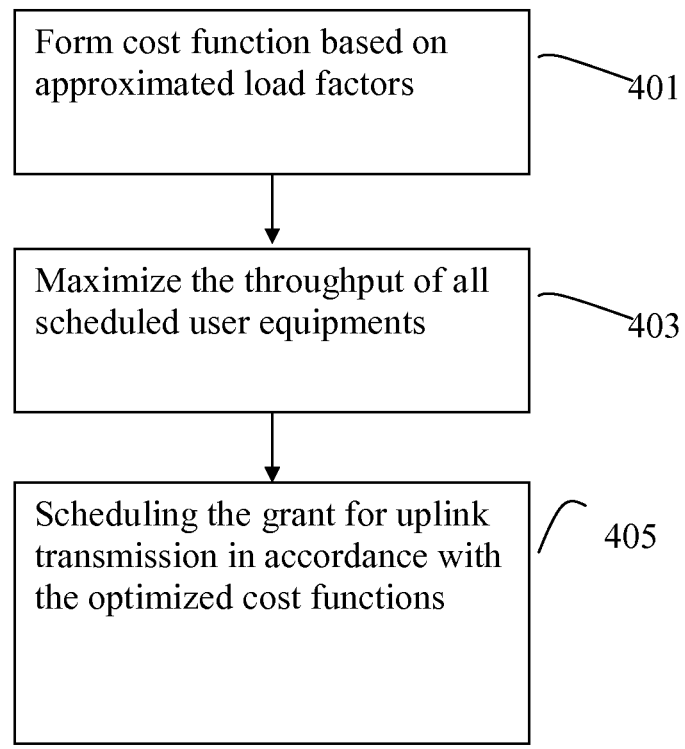
FIG. 4 is a flow chart depicting different steps performed when scheduling uplink transmissions.

In FIG. 4 a flow chart illustrating some procedural steps described above when scheduling transmission in the uplink are illustrated. First in a step 401, a cost function based on the load factor for each user equipment that is to be scheduled for uplink transmission, wherein the cost function is approximated by a quadratic function is formed. Next, in a step 403 the throughput of all scheduled user equipments is maximized using a convex optimization of the sum of the individual cost functions. Then, in a step 405, the grant(s) for uplink transmission are scheduled in accordance with the optimized cost functions.

Analysis and Computation Methods

Below a number of results on the solution to the optimization problem in different situations are provided.

Unconstrained UEs, Equal Weights

In a first exemplary embodiment: Consider the equations (7)-(11) above without the upper load limit of the users, with the weights $w_i$ being equal. Then the solution is to give each user the grant corresponding to the minimum load and to give any free load headroom to a single user. In some embodiments if the minimum loads are equal any user can be given the available load, otherwise the load is given to the user with the least minimum load.

Computation Method 1

First give each user the grant corresponding to the minimum load. Then give any free load headroom to a single user. If the minimum loads are equal any user can be given the available load, otherwise the load is given to the user with the largest minimum load Unconstrained UEs, Unequal Weights In accordance with another exemplary embodiment consider equations (7)-(11) without the upper load limit of the users, with the weights $w_i$ being unequal. If the minimum user load is $L_b$ for all users, the solution to the scheduling problem is to give a grant corresponding to the load $L_{Max} - (n-1)L_b$ to (one of) the user(s) with the largest weight and to give all other users grants corresponding to the load $L_b$.

Computation Method 2

In accordance with some embodiments, give a grant corresponding to the load $L_{Max} - (n-1)L_b$ to (one of) the user(s) with the largest weight. Then give all other users grants corresponding to the load $L_b$.

Constrained UEs, Equal Weights

In accordance with another exemplary embodiment consider equations (7)-(11) with equal lower load bounds $L_b$ for the users. The solution is then to give each user a grant corresponding to the minimum load. The user I with the largest upper bound that has not been allocated a further load is then given the load $\min(I_{i,u}-L_b, L_{Max}-L_{Allocated})$, until the total load is $L_{Max}$ or until all users are allocated their maximum load, also known as greedy filling.

Computation Method 3

In accordance with some embodiments all users are given grants corresponding to the minimum load. Then allow each user the opportunity to fill the available head room, starting with the user with the highest maximum load.

Constrained UEs, Unequal Weights

In accordance with yet another embodiment rank the users according to the value $w_i(\min(L_{i,u}, L_F+L_{i,l})+L_{i,l}-2c)$, where $L_F$ is the free headroom, i.e., $L_F=L_{HR}-\Sigma_{i=1}^{n} L_{i,l}$. A near optimal solution to the scheduling problem is then obtained by first giving each user a grant corresponding to their minimum load, followed by greedy filling according to the ranking above.

Computation Method 4

In accordance with some embodiments the users are ranked according to the value $w_i(\min(L_{i,u}, L_F+L_{i,l})+L_{i,l}-2c)$, where $L_F$ is the free headroom, i.e., $L_F=L_{HR}-\Sigma_{i=1}^{n} L_{i,l}$ Then give all users grants corresponding to their individual minimum load. Finally allow each user the opportunity to fill the available head room, starting with the user with the highest ranking.

Refinement to the Case with Constrained Users, Unequal Weights

In accordance with some embodiments computation method 4 as described above can be refined as follows: Suppose that the second last user to receive an allocation in the previous iteration was user m. Re-rank the users m+1, ..., n after allocating loads for the first m users according to the value $$w_i(\min(L_{i,u}, L'_F+L_{i,l})+L_{i,l}-2c),$$

where $L'_F$ is the portion of the free headroom that has not yet been allocated. This procedure can be repeated multiple times.

Computation Method 4 yields a near optimal (or, in some cases, an optimal) solution. If the solution is not optimal, the refinement will typically be a better (higher throughput, closer to optimal) solution.

The refinement involves repeating computation method 4 on users $m_+1$ to n, with $L_F$ replaced by $L'_F$ replaced by. As described above, this involves re-ranking users m+1 to n and then continuing to fill the available headroom. Since user m+1 is the final user to receive an allocation in computation method 4, the refinement has no effect on the first m allocations. This means that each iteration of the refinement affects only the last allocation of the previous iteration.

Note that the refinement does not necessarily result in a better solution. However, it can be shown that refinement decreases the bound on the error between the solution and the optimal solution.

More specifically, it can be shown that if:

J* is the optimal throughput, and J' is the throughput resulting from computation Method 4, then it can be shown that:

$$J^*-J' \leq k_1 \text{ for some value } k_1.$$

Let J" be the throughput after one iteration of the refinement. It can be shown that $J^*-J'' \leq k_2$, where $k_2 \leq k_1$.

Incorporation of Ramping Constraints

In accordance with some embodiments the scheduling is adapted to take into account existing ramping constraints. For example, suppose that the maximum allowable increase in the load per user (per scheduling interval) is $\Delta L_u$ and the maximum allowable decrease is $\Delta L_d$ (i.e., $L_i(k+1)-L_i(k) \leq \Delta L_u$ and $L_i(k+1)-L_i(k) \geq -\Delta L_d$).

Computation Method 5:

In accordance with some embodiments, at each time k+1, set each upper bound $L_{i,u}$ to $L_i(k)+\Delta L_u$ and set each lower bound $L_{i,l}$ to $L_i(k)-\Delta L_d$. Then apply Computation method 4 as described above to determine $L_i(k+1)$.

Fairness

In accordance with some embodiments fairness is introduced to the above solution of the optimization problem in equations (7)-(11) by means of an adaptive update of the weights $w_i$, in response to past computed load allocations. The scheduling is performed taking the updated weights into account.

In accordance with one exemplary to achieve fairness the weights at each scheduling interval are computed as $$x_i(k+1) = \lambda x_i(k) + (1-\lambda)\gamma_i \quad (12)$$

$$w_i(k) = \frac{1}{nx_i(k)}\sum_{i=1}^{n} x_i(k). \quad (13)$$

Above $\lambda$, is between 0 and 1 ($0<\lambda<1$). In the results section below $\lambda=0.8$. Further, n is first used in Equation 1, and is the total number of users. $x_i$ is defined in equation (12).

The effect of (12) and (13) is to reduce the weight of a user in the interval after said user was given a high grant.

Throughput Distribution

In the case in which $L_{i,u} \leq L_F+L_{i,l}$, the above fairness scheme attempts to equalize the normalized rates $\tilde{r}/(L_{i,u}+L_{i,l}-2c)$, where $\tilde{r}_i$ is the average rate for user i. This implies that the average fraction of the throughput which is allocated to each user is approximately given by $$\frac{(L_{i,u}+L_{i,l}-2c)}{\sum_{k=1}^{n}(L_{k,u}+L_{k,l}-2c)}.$$

Modification of Scheme to Achieve a Desired Throughput Distribution

In accordance with some embodiments computation method 4 can be modified to achieve (approximately) a desired throughput distribution as follows: Rank the users according to the value $w_i r_i$, where the $r_i$'s are chosen so that the desired throughput fraction for user i is given by:

$$\frac{r_i}{\sum_{k=1}^{n} r_k}.$$

Give all users grants corresponding to their individual minimum load. Finally allow each user the opportunity to fill the available head room, starting with the user with the highest ranking. This scheme results in a throughput distribution which is approximately equal to the desired distribution.

In the case in which there are ramping constraints, a desired throughput distribution can be achieved (approximately) by replacing the ranking algorithm in Computation 5 with the ranking method above.

Results

Figure 5:
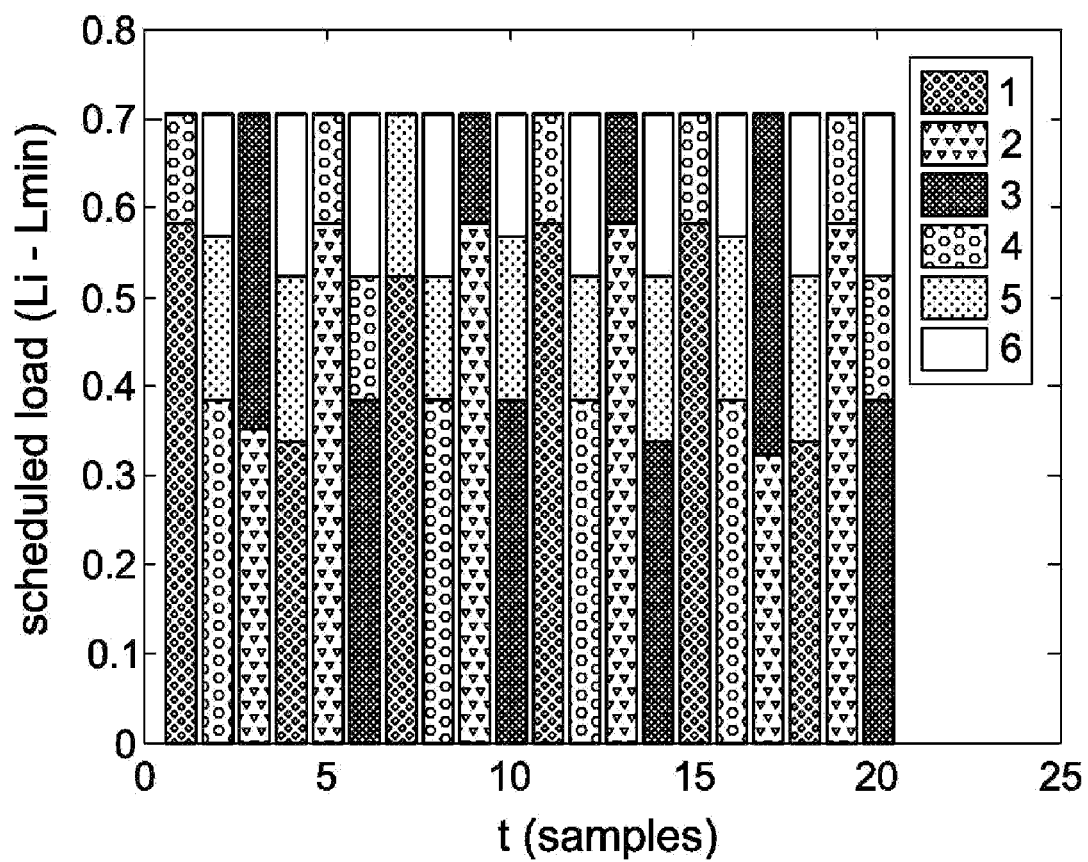
FIGS. 5 and 6 illustrate the scheduled loads and scheduled grants, respectively.
Figure 6:
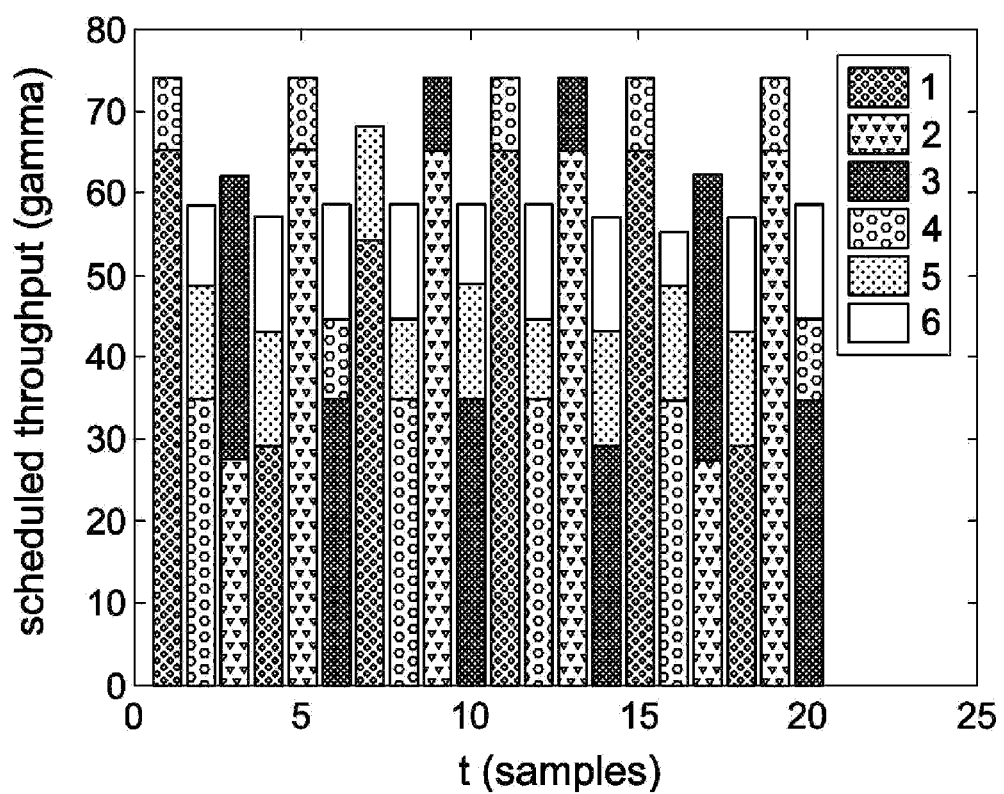
Figure 7:
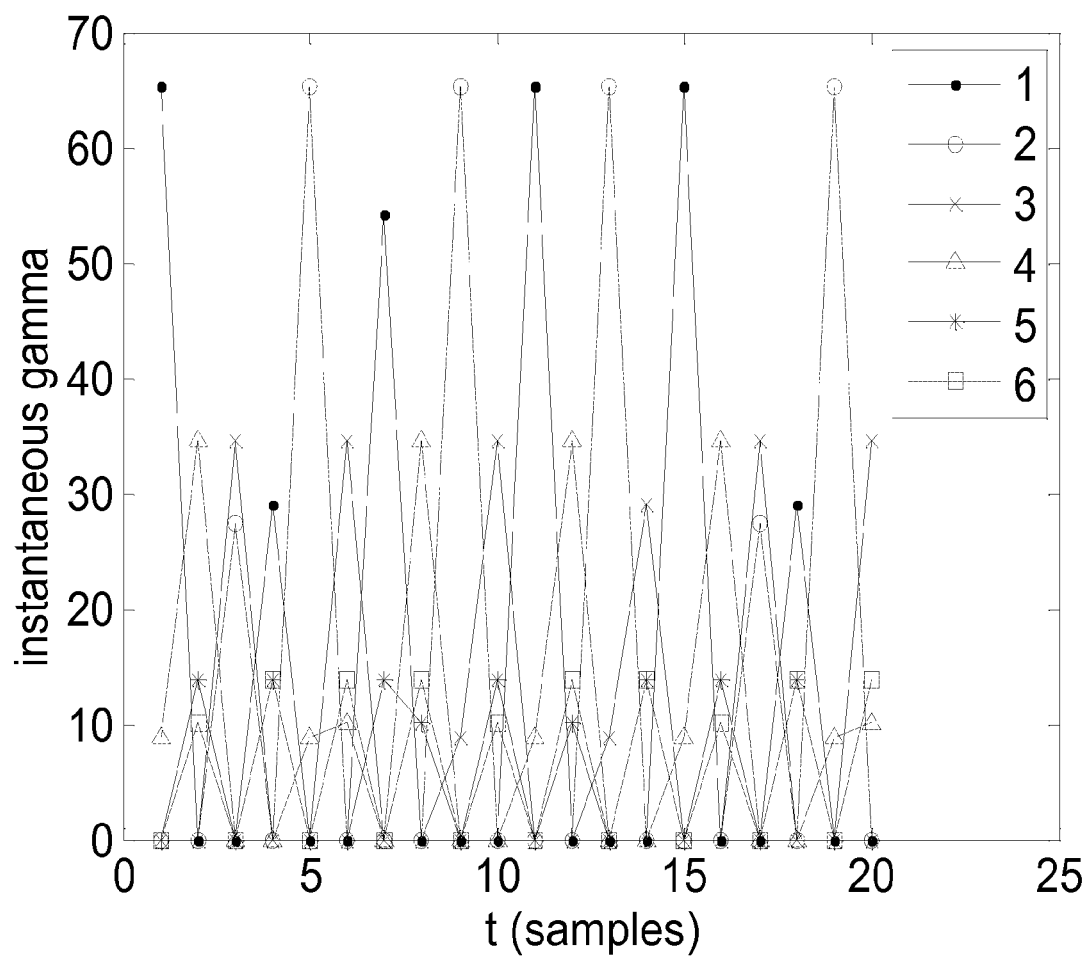
FIG. 7 illustrates the grant for each user as a function of time.
Figure 8:
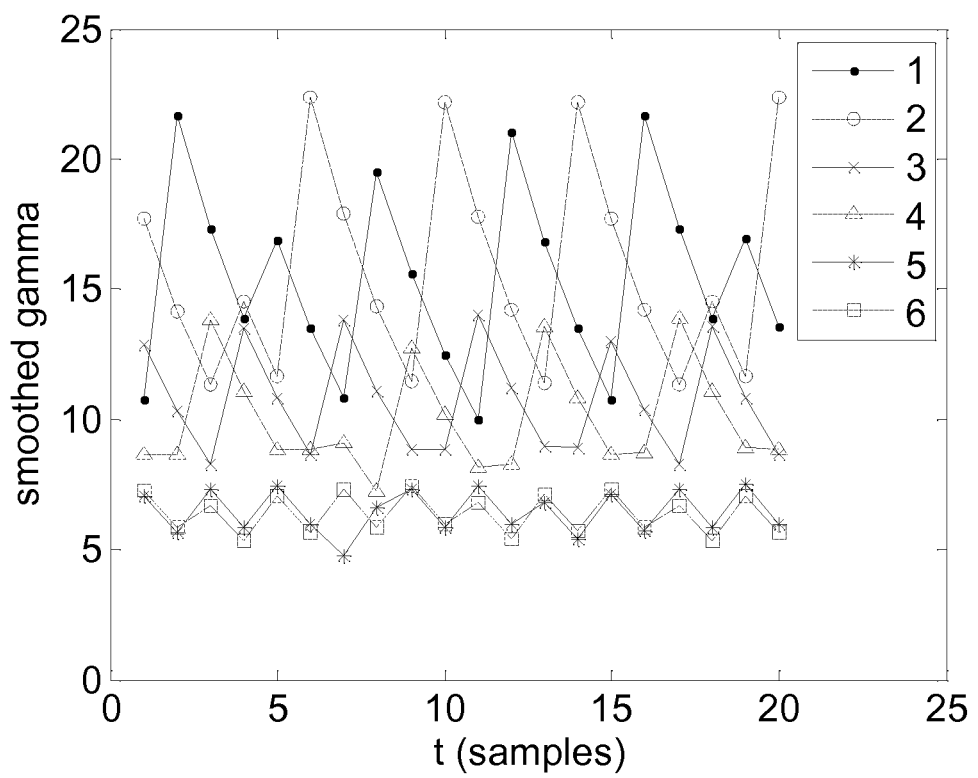
FIG. 8 illustrates the smoothed grant for each user as a function of time.
Figure 9:
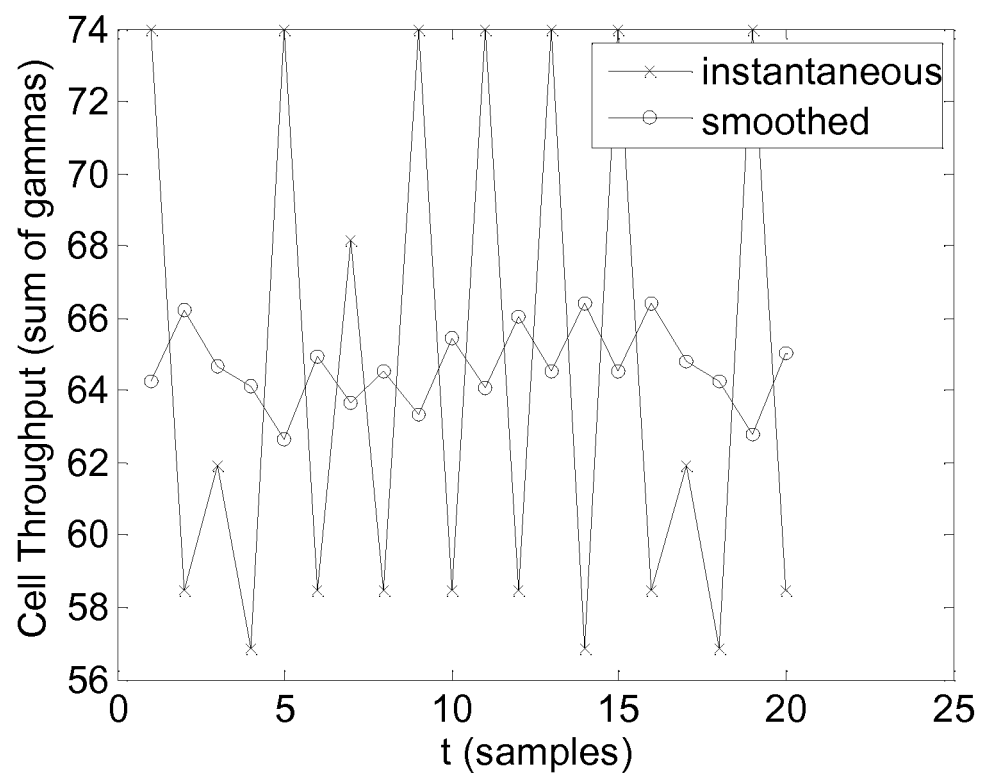
FIG. 9 illustrates the total cell throughput.
Figure 10:
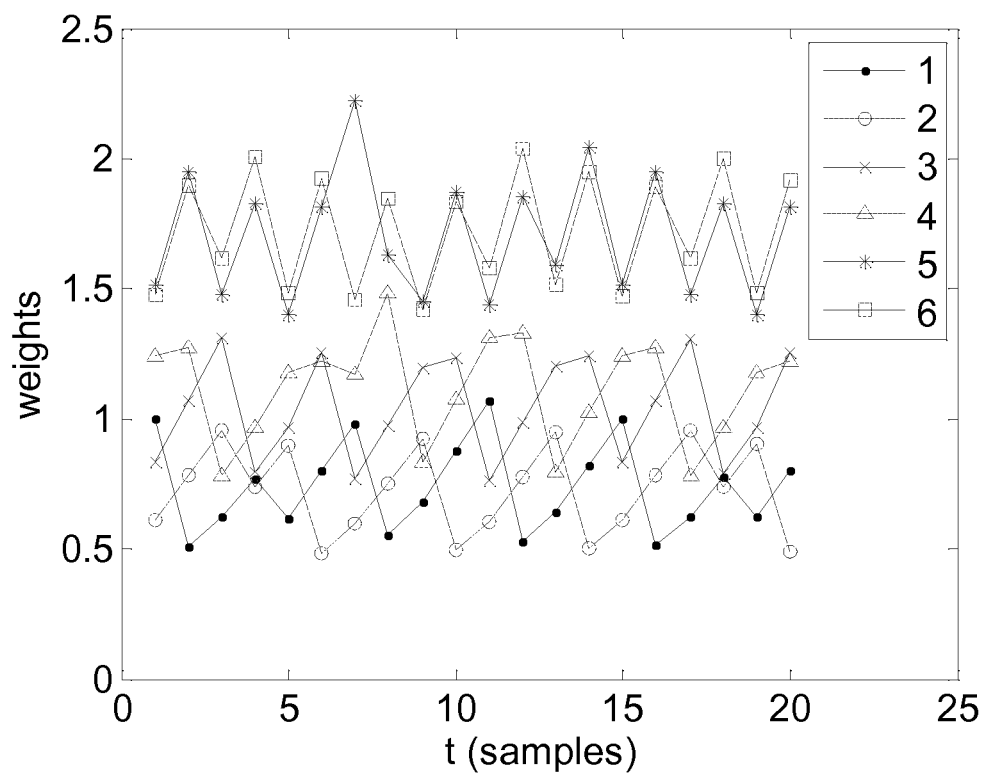
FIG. 10 illustrates weights for different users.
Figure 11:
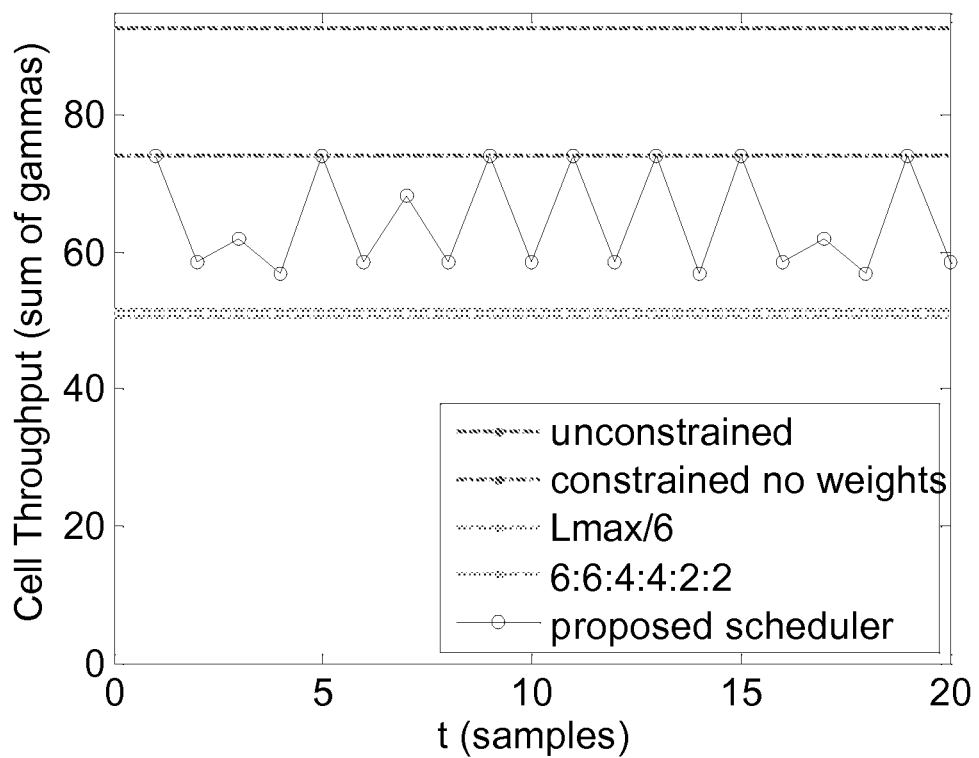
FIG. 11 is an illustration comparing different scheduling methods.

The above scheme was simulated for six users with maximum loads of 0.6, 0.6, 0.4, 0.4, 0.2 and 0.2. The maximum allowed load was 0.8 and λ, was 0.8. The results appear in FIGS. 5-11. FIGS. 5 and 6 show the scheduled loads and scheduled grants/gamma, respectively. FIG. 7 shows the grant/gamma for each user as a function of time, and FIG. 8 shows the smoothed grant/gamma (12) for each user as a function of time, FIG. 9 shows the total cell throughput (sum of the grants/gamma), and FIG. 10 shows the weights for each user (13). FIG. 11 compares the algorithms of embodiments described herein to the following other strategies:

(i) Unconstrained: This represents the cell throughput achievable with one user only.
(ii) Constrained no weights: This represents the cell throughput achievable with constraints but equal weights.
(iii) Lmax/6: This represents the throughput when all the users are given an equal share of the headroom.
(iv) 6:6:4:4:2:2: This represents the throughput when the load is shared in proportion to the UE capability.
(v) WTWF (I): An exemplary scheme.

As can be seen the scheduling methods as described herein will provide significant advantages in terms of performance.

Figure 12:
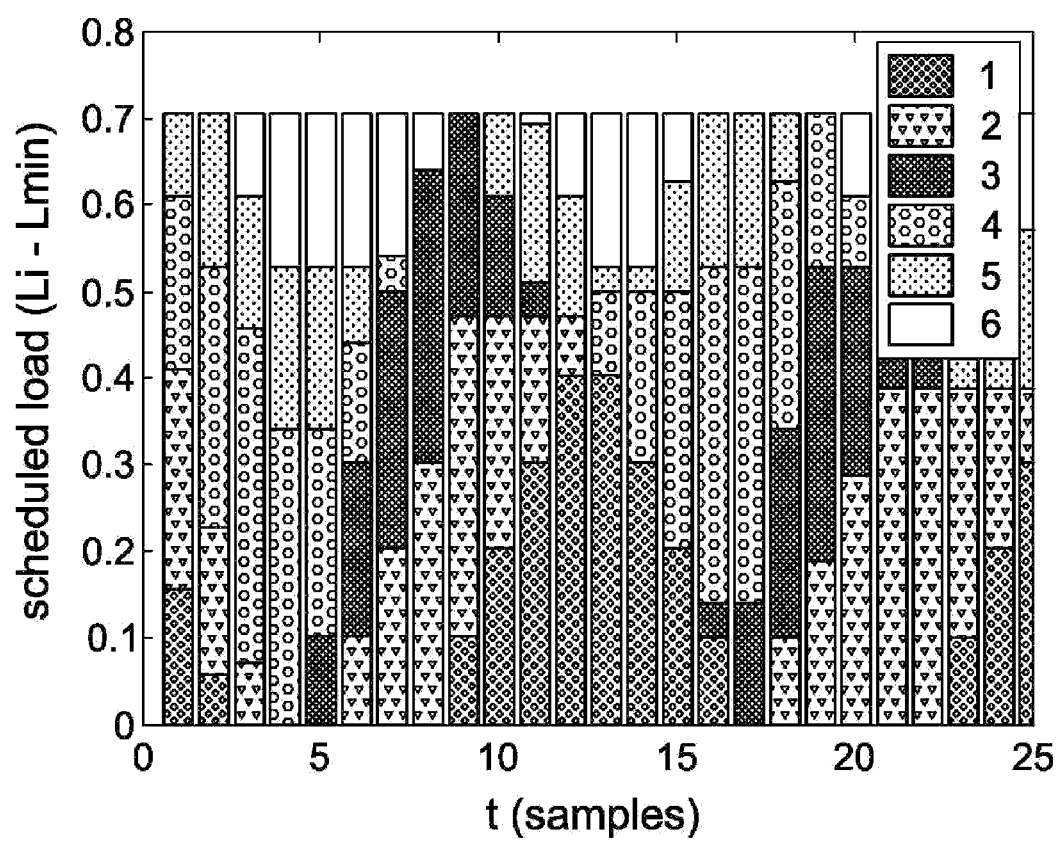
FIGS. 12 and 13 illustrate scheduled loads and grants.
Figure 13:
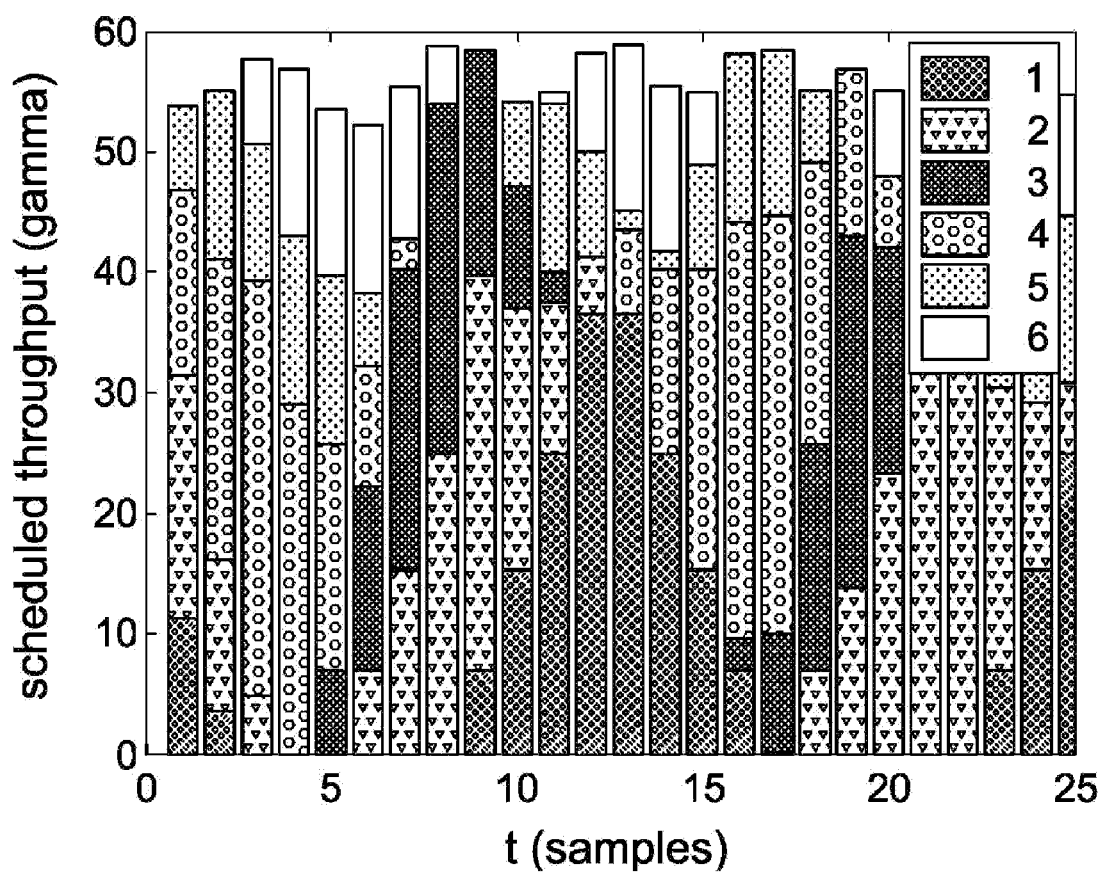
Figure 14:
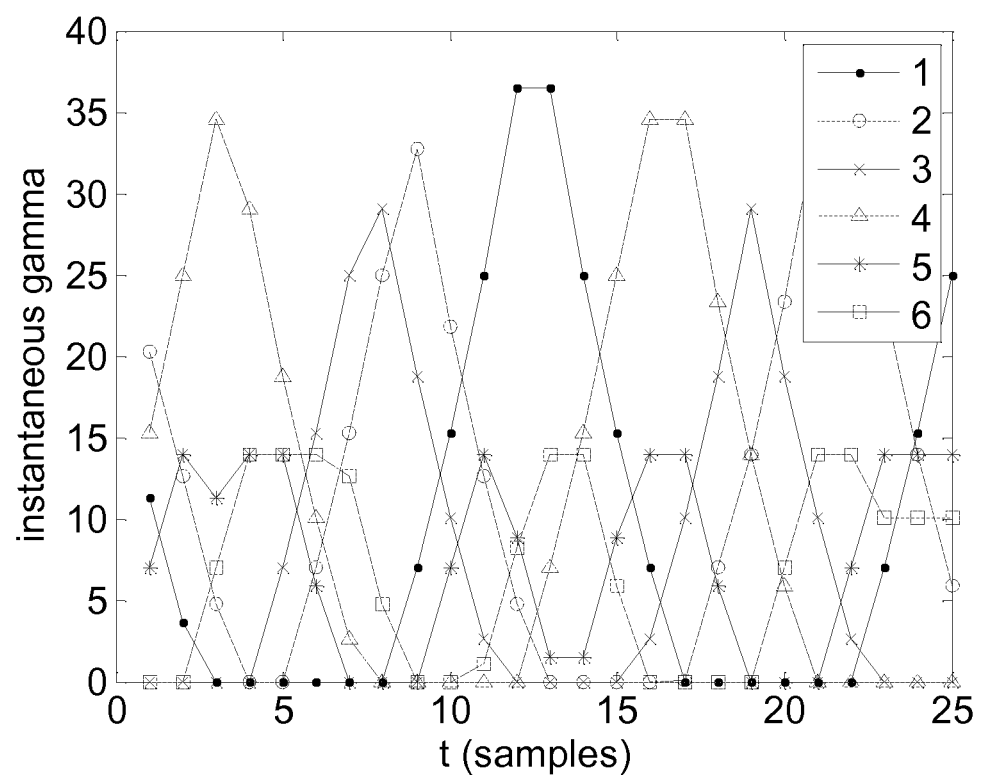
FIGS. 14 and 15 illustrate grants and smoothed grants as a function of time.
Figure 15:
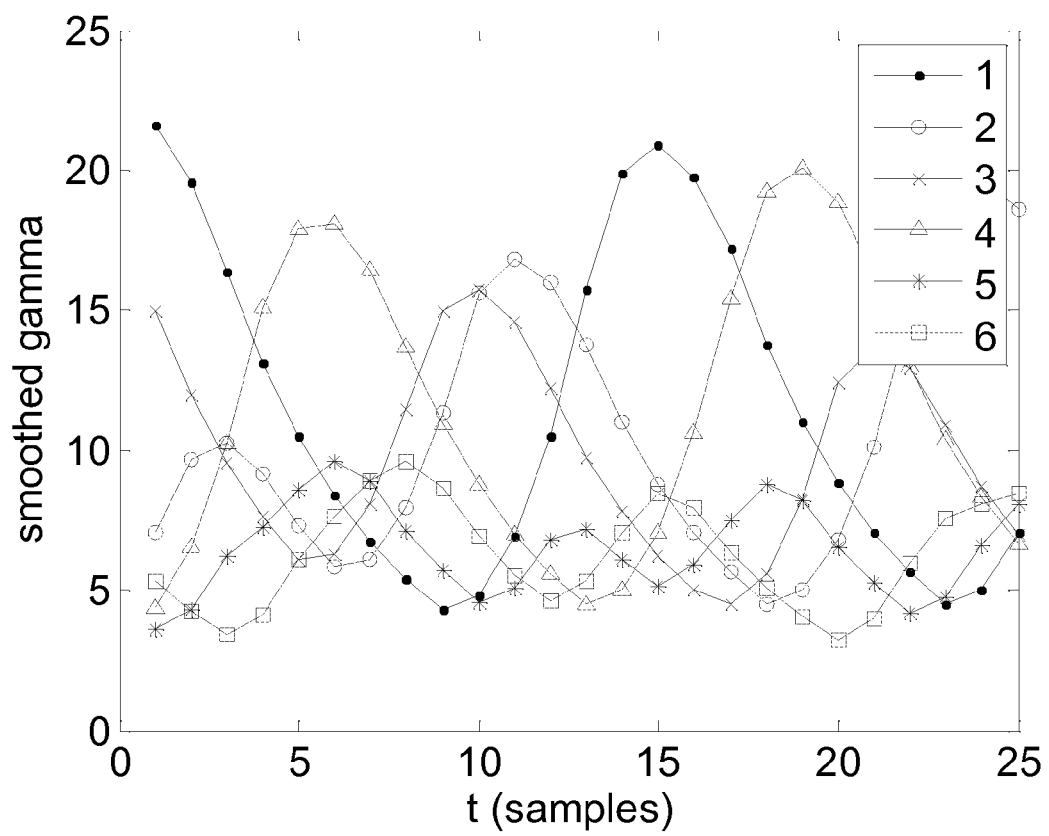
Figure 16:
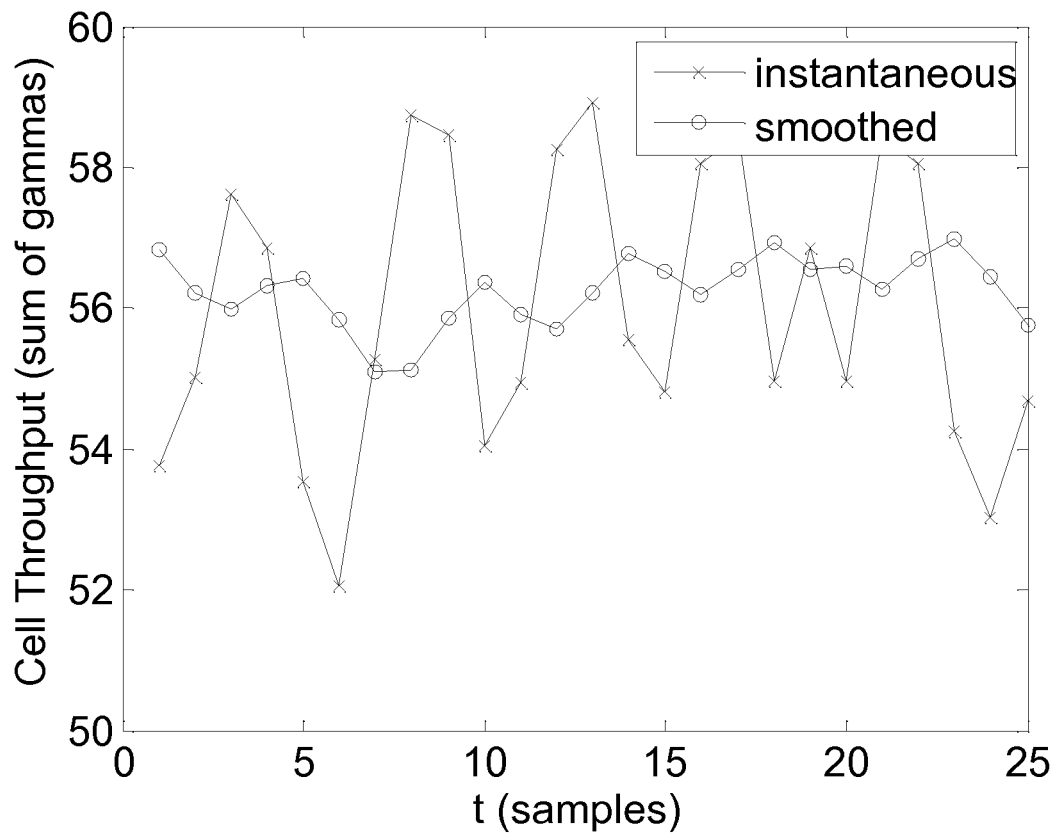
FIG. 16 illustrates a total cell throughput.

FIGS. 12-16 show the results when the simulation is repeated with ramping constraints. In this case, the maximum change in load per user per scheduling interval is limited to 0.1. FIGS. 12 and 13 show the scheduled loads and grants, FIGS. 14 and 15 show the grants and the smoothed grants as a function of time, and FIG. 16 shows the total cell throughput (sum of the grants). It can be seen that the ramping constraints are satisfied at the expense of a modest decrease in throughput.

Using methods and devices for scheduling uplink transmission in a cellular radio system as described herein will enable an enhanced mobile broadband performance, e.g.

Enhanced EUL throughput.
Increased EUL stability margins, reducing the risk of power rushes for EUL.
Increased EUL cell coverage.

Further advantages that can be achieved include a generalization of Time Division (TD) scheduling and a seamless tuning between fairness and throughput.

Still further advantages that can be achieved include a systematic computation of optimal grants, using relatively low complexity algorithms suitable for real time implementation in WCDMA.

The invention claimed is:

1. A method of scheduling uplink transmission in a cellular radio system for a number of user equipments transmitting data over an air-interface, each user equipment being associated with an individual uplink load factor, the method comprising:
forming a cost function based on the load factor for each user equipment that is to be scheduled for uplink transmission, wherein the cost function is approximated by a quadratic function;
maximizing the throughput of all scheduled user equipments using a convex optimization of the sum of the individual cost functions; and
scheduling the grant for uplink transmission in accordance with the optimized cost functions.

2. The method of claim 1, further comprising:
allocating a determined minimum load to all user equipments to be scheduled.

3. The method of claim 2, further comprising:
ranking the user equipments in some order from a highest rank to a lowest rank, and
allocating the available load remaining when the minimum load has been allocated to the user equipments in order of the ranking form the highest to the lowest.

4. The method of claim 3, wherein each user equipment allocated more than the minimum load is allocated the maximum load of the user equipment or if the maximum load is more than the available load the available load.

5. The method of claim 1, wherein the scheduling takes into account existing ramping constraints.

6. The method of claim 1, wherein each user equipment is associated with a weight, said weight being adaptively updated in response to past computed load allocations and wherein the scheduling is performed to take the updated weights into account.

7. A node in a cellular radio system adapted to schedule uplink transmission in the cellular radio system for a number of user equipments transmitting data over an air-interface, each user equipment being associated with an individual uplink load factor, the node comprising:
controller circuitry adapted to form a cost function based on the load factor for each user equipment that is to be scheduled for uplink transmission, wherein the cost function is approximated by a quadratic function;
controller circuitry adapted to maximize the throughput of all scheduled user equipments using a convex optimization of the sum of the individual cost functions; and
controller circuitry adapted to schedule the grant for uplink transmission in accordance with the optimized cost functions.

8. The node of claim 7, wherein the controller circuitry is further adapted to allocate a determined minimum load to all user equipments to be scheduled.

9. The node of claim 8, wherein the controller circuitry is further adapted to rank the user equipments in some order from a highest rank to a lowest rank, and to allocate the available load remaining when the minimum load has been allocated to the user equipments in order of the ranking form the highest to the lowest.

10. The node of claim 9, wherein the controller circuitry is further adapted to allocate, to each user equipment allocated more than the minimum load, the maximum load of the user equipment, or, if the maximum load is more than the available load, the available load.

11. The node of claim 7, wherein the wherein the controller circuitry is further adapted to perform the scheduling taking into account existing ramping constraints.

12. The node of claim 7, wherein each user equipment is associated with a weight, and wherein the controller circuitry is further adapted to adaptively update said weight in response to past computed load allocations and wherein the controller circuitry is adapted to perform the scheduling taking the updated weights into account.

* * * * *